(12) United States Patent
Abts

(10) Patent No.: US 9,459,628 B1
(45) Date of Patent: Oct. 4, 2016

(54) SYSTEM AND METHOD FOR MOVING SPANS OF AN IRRIGATION SYSTEM

(71) Applicant: Kevin Abts, Omaha, NE (US)

(72) Inventor: Kevin Abts, Omaha, NE (US)

(73) Assignee: Precision Circle, LLC, Denver, CO (US)

( * ) Notice: Subject to any disclaimer, the term of this patent is extended or adjusted under 35 U.S.C. 154(b) by 453 days.

(21) Appl. No.: 13/960,403

(22) Filed: Aug. 6, 2013

Related U.S. Application Data

(60) Provisional application No. 61/680,000, filed on Aug. 6, 2012.

(51) Int. Cl.
| | | |
|---|---|---|
| *G05D 11/00* | (2006.01) | |
| *G05D 1/02* | (2006.01) | |
| *G05D 1/10* | (2006.01) | |
| *B05B 3/00* | (2006.01) | |
| *B05B 3/18* | (2006.01) | |
| *G05D 7/06* | (2006.01) | |

(52) U.S. Cl.
CPC .................................. *G05D 7/0617* (2013.01)

(58) Field of Classification Search
CPC .......... G05B 2219/2625; A01G 25/09; A01G 25/092; A01G 25/16
USPC .................. 700/284, 302; 239/722, 723, 726
See application file for complete search history.

(56) References Cited

U.S. PATENT DOCUMENTS

| | | | | |
|---|---|---|---|---|
| 3,823,730 A |  | 7/1974 | Sandstrom | |
| 4,063,569 A | * | 12/1977 | Olson ................... | A01G 25/092 239/1 |
| 5,246,164 A | * | 9/1993 | McCann .............. | A01B 79/005 239/11 |
| 5,927,603 A | * | 7/1999 | McNabb .............. | A01G 25/092 239/63 |
| 6,042,031 A |  | 3/2000 | Christensen | |
| 6,045,065 A | * | 4/2000 | Gerdes ................. | A01G 25/092 239/1 |
| 6,095,439 A | * | 8/2000 | Segal ................... | A01G 25/092 239/69 |
| 6,290,151 B1 | * | 9/2001 | Barker ................. | A01G 25/092 239/69 |
| 6,666,384 B2 | * | 12/2003 | Prandi .................... | A01G 25/16 239/1 |
| 6,755,362 B2 |  | 6/2004 | Krieger | |
| 6,923,390 B1 | * | 8/2005 | Barker ................. | A01G 25/092 239/728 |
| 6,978,794 B2 | * | 12/2005 | Dukes .................. | A01G 25/167 137/1 |
| 7,384,008 B1 |  | 6/2008 | Malsam | |
| 7,584,053 B2 |  | 9/2009 | Abts | |
| 8,145,360 B2 | * | 3/2012 | Brundisini ......... | G05B 19/0421 379/106.01 |
| 8,401,704 B2 | * | 3/2013 | Pollock ................ | A01G 25/092 239/723 |
| 8,490,899 B2 | * | 7/2013 | Korus .................... | B62D 55/08 239/722 |
| 2002/0066810 A1 | * | 6/2002 | Prandi .................... | A01G 25/16 239/728 |
| 2006/0027677 A1 |  | 2/2006 | Abts | |
| 2010/0032495 A1 |  | 2/2010 | Abts | |
| 2012/0253530 A1 | * | 10/2012 | Malsam ................. | A01G 25/09 700/284 |
| 2012/0305682 A1 | * | 12/2012 | Korus .................. | A01G 25/092 239/731 |
| 2013/0226356 A1 | * | 8/2013 | Pfrenger .............. | A01G 25/092 700/284 |
| 2013/0253752 A1 |  | 9/2013 | Grabow | |

* cited by examiner

*Primary Examiner* — Ronald Hartman, Jr.

(74) *Attorney, Agent, or Firm* — Dorr, Carson & Birney, PC

(57) ABSTRACT

A method of moving at least two irrigation spans across a ground surface of a field may include receiving an initial movement control signal corresponding to a user-selected fluid application rate, determining the user-selected fluid application rate from the initial movement control signal, determining a position of at least one span in the field, modifying the initial movement control signal to a modified movement control signal according to a predetermined modification factor, with a value of the modification factor varying according to a position of the span in the field such that the modification factor varies among span positions, and sending the modified movement control signal to the drive motor control. A system is also disclosed.

15 Claims, 7 Drawing Sheets

| Pivot Position Degree | | Percent Rate Modifier | |
| --- | --- | --- | --- |
| Start | Stop | Forward | Reverse |
| 0 | 6 | 1.04 | 1.01 |
| 6 | 12 | 0.99 | 0.96 |
| 12 | 18 | 0.97 | 0.94 |
| 18 | 24 | 0.96 | 0.93 |
| 24 | 30 | 0.98 | 0.95 |
| 30 | 36 | 1.03 | 1.00 |
| 36 | 42 | 1.06 | 1.03 |
| 42 | 48 | 1.10 | 1.07 |
| 48 | 54 | 1.13 | 1.10 |
| 54 | 60 | 1.00 | 0.97 |
| 60 | 66 | 1.05 | 1.02 |
| 66 | 72 | 1.01 | 0.98 |
| 72 | 78 | 0.98 | 0.95 |
| 78 | 84 | 0.97 | 0.94 |
| 84 | 90 | 0.96 | 0.93 |
| 90 | 96 | 1.00 | 0.97 |
| 96 | 102 | 1.02 | 0.99 |
| 102 | 108 | 2.00 | 1.94 |
| 108 | 114 | 2.20 | 2.13 |
| 114 | 120 | 2.10 | 2.04 |
| 120 | 126 | 1.50 | 1.46 |
| 126 | 132 | 1.02 | 0.99 |
| 132 | 138 | 1.03 | 1.00 |
| 138 | 144 | 0.98 | 0.95 |
| 144 | 150 | 0.97 | 0.94 |
| 150 | 156 | 0.98 | 0.95 |
| 156 | 162 | 0.97 | 0.94 |
| 162 | 168 | 0.98 | 0.95 |
| 168 | 174 | 0.79 | 0.77 |
| 174 | 180 | 0.77 | 0.75 |
| 180 | 186 | 0.79 | 0.77 |

FIG. 6

Forward Direction Table

| Start Degree | End Degree | Sector Multiplier | | Measured Percent Rate | | Modified Percent Rate | Notes |
|---|---|---|---|---|---|---|---|
| 0 | 6 | 0.8 | x | 40 | = | 32 | |
| 6 | 12 | 0.9 | x | 40 | = | 36 | |
| 12 | 18 | 0.6 | x | 40 | = | 24 | |
| 18 | 24 | 0.7 | x | 40 | = | 28 | |
| 24 | 30 | 0.5 | x | 40 | = | 20 | |
| 30 | 36 | 0.4 | x | 40 | = | 16 | |
| 36 | 42 | 0.9 | x | 40 | = | 36 | |
| 42 | 48 | 1.0 | x | 40 | = | 40 | |
| 48 | 54 | 1.2 | x | 40 | = | 48 | |
| 54 | 60 | 1.1 | x | 40 | = | 44 | |
| 60 | 66 | 0.8 | x | 40 | = | 32 | |
| 66 | 72 | 0.9 | x | 40 | = | 36 | |
| 72 | 78 | 0.6 | x | 40 | = | 24 | |
| 78 | 84 | 0.7 | x | 40 | = | 28 | |
| 84 | 90 | 0.5 | x | 40 | = | 20 | |
| 90 | 96 | 0.4 | x | 40 | = | 16 | |
| 96 | 102 | 0.9 | x | 40 | = | 36 | |
| 102 | 108 | 1.0 | x | 40 | = | 40 | |
| 108 | 114 | 1.2 | x | 40 | = | 48 | |
| 114 | 120 | 1.1 | x | 40 | = | 44 | |
| 120 | 126 | 0.8 | x | 40 | = | 32 | |
| 126 | 132 | 0.9 | x | 40 | = | 36 | |
| 132 | 138 | 0.6 | x | 40 | = | 24 | |
| 138 | 144 | 0.7 | x | 40 | = | 28 | |
| 144 | 150 | 0.5 | x | 40 | = | 20 | |
| 150 | 156 | 0.4 | x | 40 | = | 16 | |
| 156 | 162 | 0.9 | x | 40 | = | 36 | |
| 162 | 168 | 1.0 | x | 40 | = | 40 | |
| 168 | 174 | 1.2 | x | 40 | = | 48 | |
| 174 | 180 | 1.1 | x | 40 | = | 44 | |
| 180 | 186 | 0.8 | x | 40 | = | 32 | |

FIG. 7

SYSTEM AND METHOD FOR MOVING SPANS OF AN IRRIGATION SYSTEM

REFERENCE TO RELATED APPLICATION

This application claims the priority of U.S. provisional patent application No. 61/680,000, filed Aug. 6, 2012, which is hereby incorporated by reference in its entirety.

BACKGROUND

1. Field

The present disclosure relates to the movement of irrigation systems and more particularly pertains to a new system and method for moving spans of an irrigation system for providing the benefits of variable rate irrigation according to a prescription while providing more familiar local control to the operator in the field.

2. Description of the Prior Art

In a conventional mechanized irrigation system, a fluid application rate may be selected at which the fluid (typically water) applied to the field is controlled as a percentage of a maximum base movement rate. (The fluid application rate is sometimes expressed in terms of a fluid application depth, which is a measurement of the vertical depth of the fluid, applied by a single rotation of the irrigation system, that would cover the irrigated area of land if there was no drainage or ground absorption to dissipate the fluid.) The water flows through the irrigation system at essentially a constant and uniform rate, and the fluid application rate is thus controlled by controlling the rate of movement of the irrigation system in the field, such as by the rate of rotation of a center pivot irrigation system. However, the rate of movement of the irrigation system is typically not a uniform speed of constant movement that is maintained as the irrigation system moves over the field, but rather a cycle of alternating periods of moving the irrigation system and stopping the movement of the irrigation system as the irrigation system operates (and the water flows). The relationship between the time period of movement and time period of stopping controls the overall rate of movement or speed of the irrigation system, and thus the overall water application rate (or depth).

The rate at which the water is applied to the field is commonly referred to as a percentage of the maximum rate at which the irrigation system moves over the field. The percentage, percent rate or speed also is an indication of the percentage of time that the center pivot span is moving or rotating, with the balance being time that the irrigation system is stopped. For example, the percentage, percent rate or speed indicates the percentage of a particular time frame that the span of the irrigation system is moving and rotating about the center. For example, a 75 percent rate indicates that 75 percent of one minute (e.g., 45 seconds), the span is moving, and the remainder of the time (e.g., 15 seconds) the span is stationary. The more time that the irrigation system is moving, the "faster" the center pivot span rotates about the field (speed), and the less water that is applied to a particular location in the field and, therefore, the lower the water application rate Conversely, the less time that the irrigation system is moving (and is stopped), the "slower" the center pivot span rotates about the field (speed), and the more water is applied to a particular location in the field, thus increasing the water application depth. In other words, the more time that the irrigation system spends rotating, the more ground that the span covers in a given time period having dispensed the same amount of water. The water application rate control may allow the user to select a setting that directly correlates to a percent rate and the control may be calibrated in terms of the water application depth and is often expressed in inches, centimeters or millimeters. The rate control may include a device located at the control panel or a secondary remote control device of the irrigation system. The rate setting selected by the user then typically moves the irrigation system at the same rate for an entire revolution of the span.

The conventional irrigation system control set forth above is typically set with a single value to control the base movement rate, or the uniform water application rate or depth, for the entire field, and not for the immediate area under the span. Thus, there is no variation in the rate of movement or speed as the span rotates over field locations where the soil texture, i.e., water holding capacity, or the topography of the field vary, and therefore the water application depth requirements vary.

Systems have been devised for varying the local movement rates at which the water is applied to the field at various angular positions or degrees of the spans of the irrigation system from the center point. These systems typically employ the use of a local movement rate prescription or table of values that is uploaded to the irrigation system, and the values set the local movement rates or speeds at the various (angular) locations in the field. The values in the table, however, only reflect a single base movement rate which has been adjusted for the local water application rates or depths applicable to that field. In other words, while the local movement rate about the field will vary according to the values in the table, the values in the table typically reflect a percentage adjustment of one particular base movement rate (such as 50 percent).

Therefore, in such systems, in order for the operator/farmer to change the base movement rate at which water is generally applied to the field, such as based upon general moisture conditions (e.g., whether it has rained recently or the weather has recently been particularly warm or forecasted to be warm, or whether the average soil moisture content is high or low), a different table of values must be uploaded that is based upon both the local movement rate adjustment and the (new) base movement rate selected by the operator/farmer.

SUMMARY

In one aspect, the disclosure relates to a method of moving at least two irrigation spans across a ground surface of a field, with at least one tower supporting the spans and the at least one tower having a wheel driven by a drive motor controlled by a drive motor control. The method may comprise receiving an initial movement control signal corresponding to a user-selected fluid application rate, determining the user-selected fluid application rate from the initial movement control signal, determining a position of at least one span in the field, and modifying the initial movement control signal to a modified movement control signal according to a predetermined modification factor, with a value of the modification factor varying according to a position of the span in the field such that the modification factor varies among span positions. The method may further comprise sending the modified movement control signal to the drive motor control.

In another aspect, the disclosure relates to an irrigation system that may comprise at least two irrigation spans for moving across a ground surface of a field, at least one tower supporting the spans, a wheel mounted on the at least one tower, a drive motor connected to the wheel to rotate the wheel, and a drive motor control controlling power to the drive motor. The system may also include a movement modification device mounted on one of the spans, and the movement modification device may be configured to receive an initial movement control signal corresponding to a user-selected fluid application rate, determine the user-selected fluid application rate from the initial movement control signal, and determine a position of at least one span in the field. The movement modification device may also be configured to modify the initial movement control signal to a modified movement control signal according to a predetermined modification factor, with a value of the modification factor varying according to a position of the span in the field such that the modification factor varies among span positions, and a plurality of values of the modification factor being stored in a position table in a storage of the movement modification device. The table may include a plurality of position values and values of the modification factor corresponding to the position values. The movement modification device may also be configured to send the modified movement control signal to the drive motor control.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 6 is a schematic table showing values in a table of movement modification factors corresponding to sectors of a field, with values for both forward and reverse movement, according to an illustrative embodiment.

FIG. 7 is a schematic table showing calculation of modified values for the modified movement signal using the user-selected initial movement rate of 40 percent and various modification factors taken from a table of values for the different sectors of a field.

DETAILED DESCRIPTION

Figure 1:
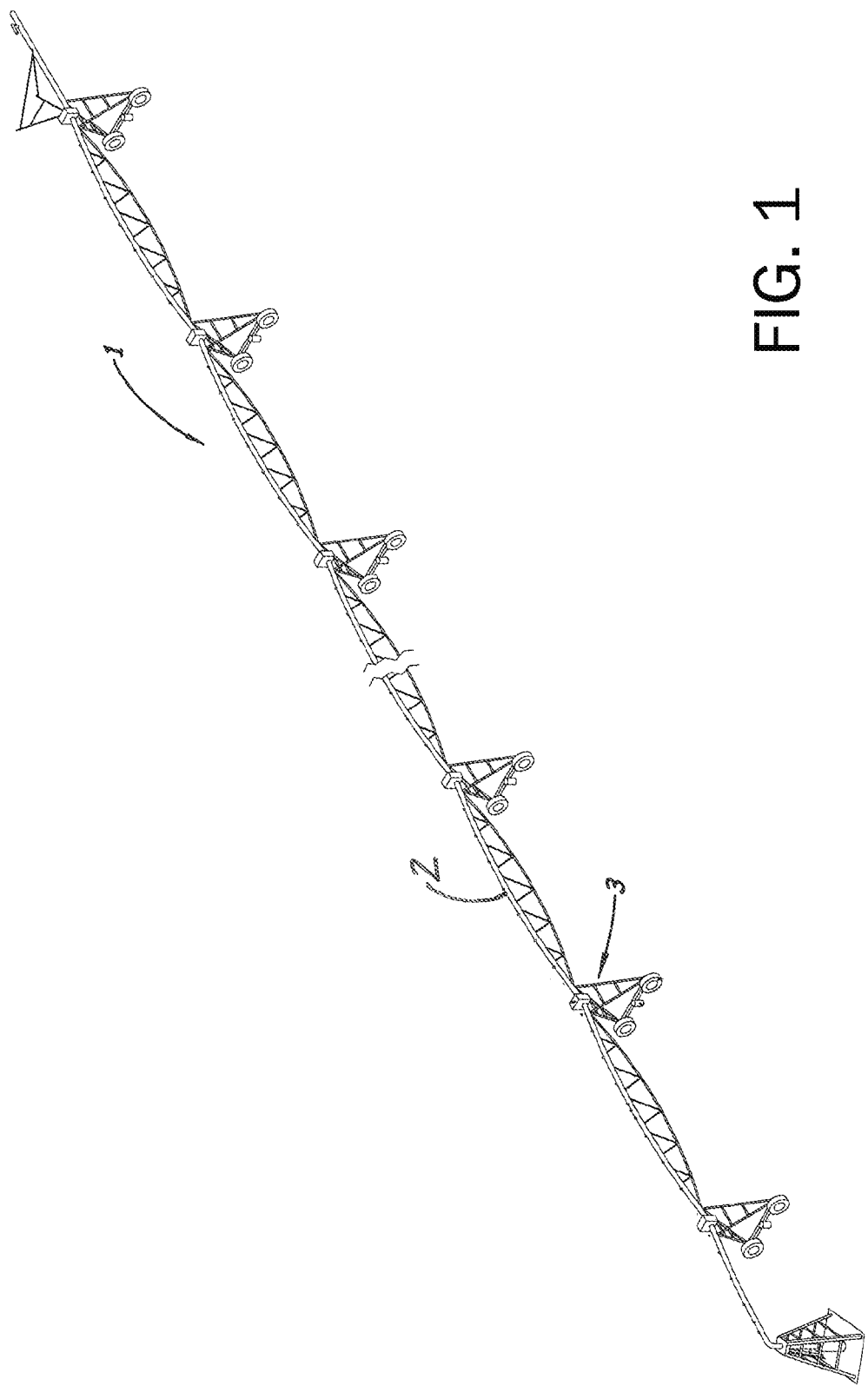
FIG. 1 is a schematic perspective view of an irrigation system according to the present disclosure.
Figure 2:
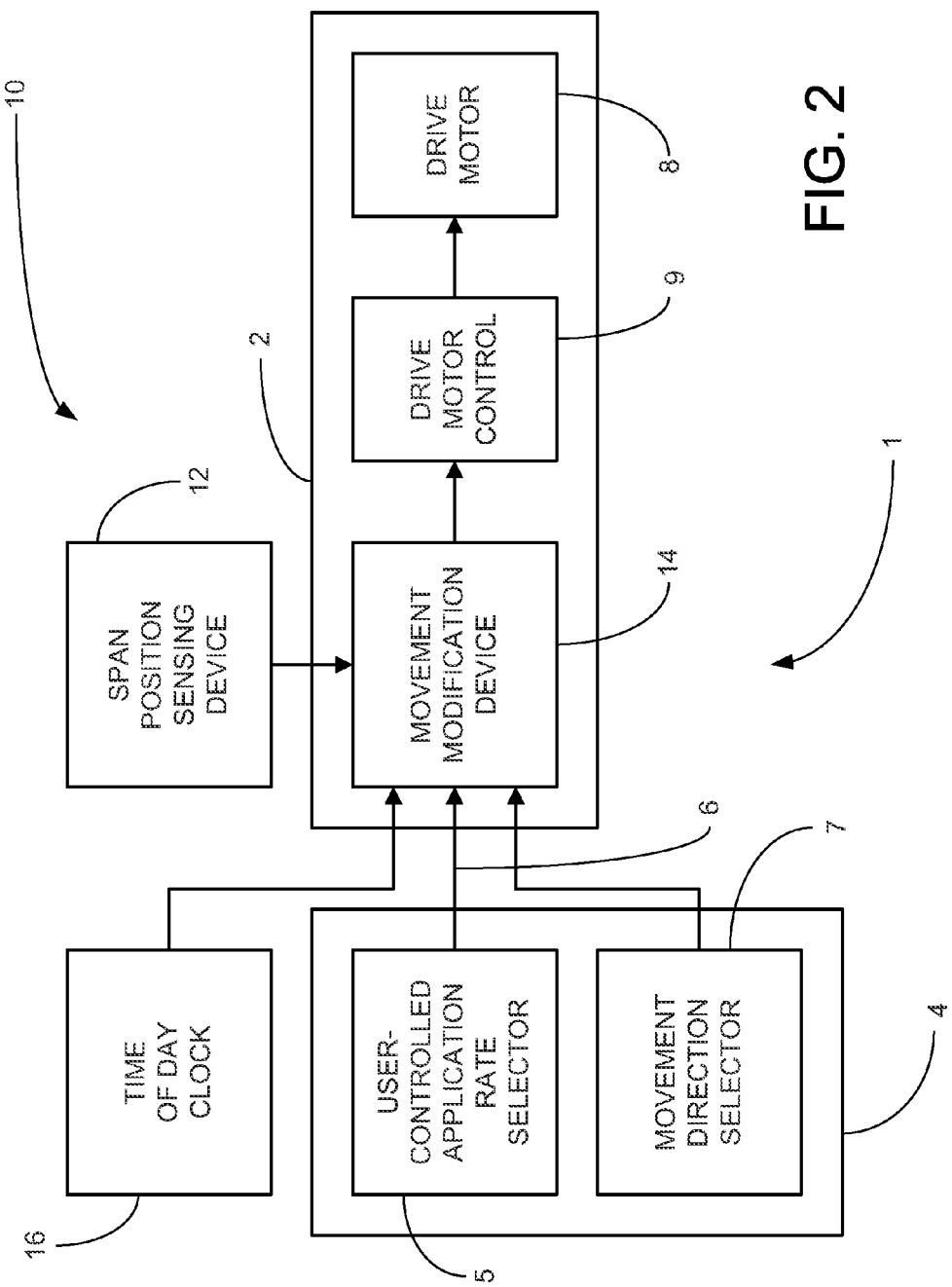
FIG. 2 is a schematic block diagram of elements of the span movement modification system, according to an illustrative embodiment.
Figure 3:
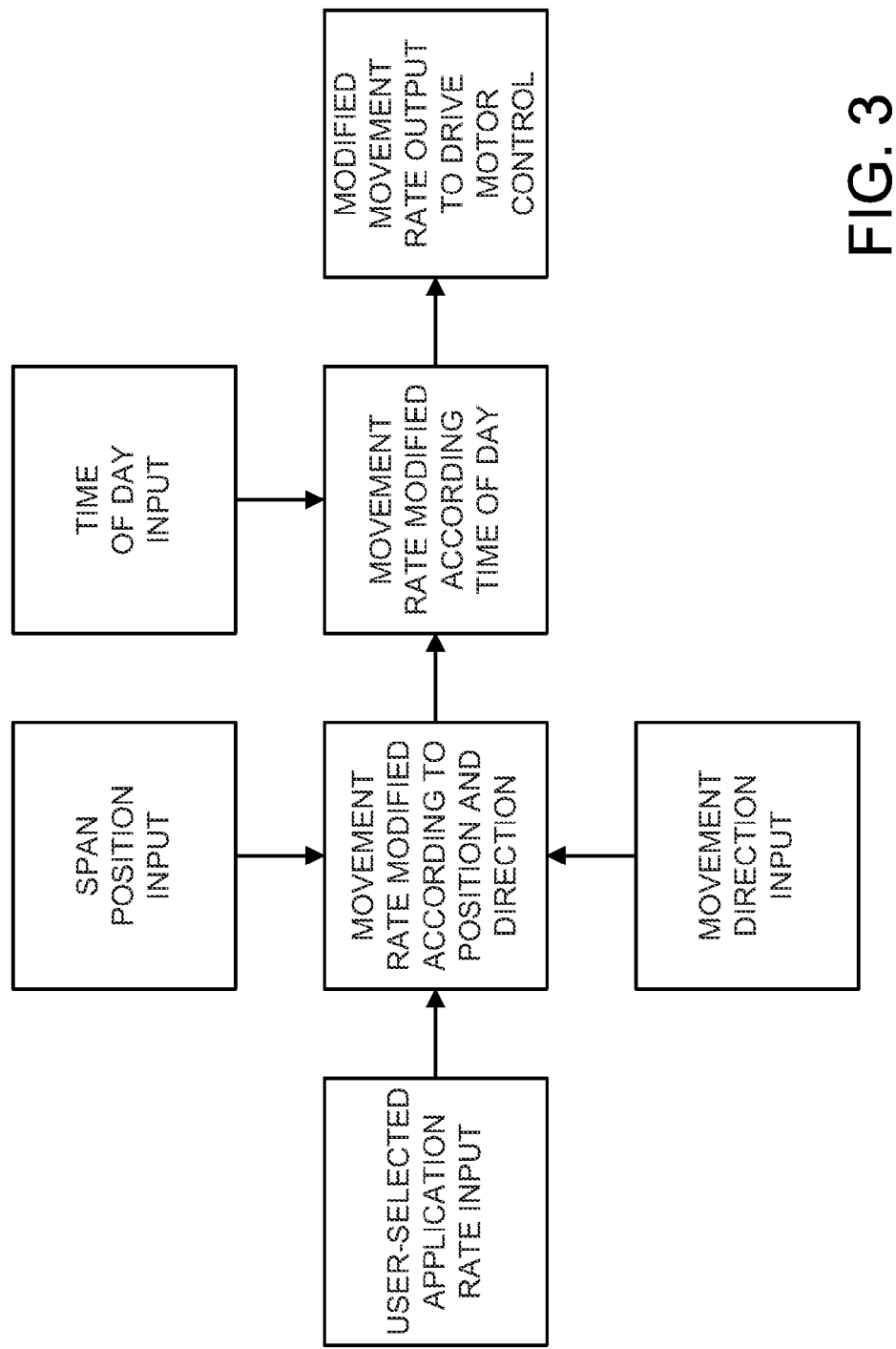
FIG. 3 is a schematic block diagram of aspects of the interaction of some of the elements of the system, according to an illustrative embodiment.
Figure 4:
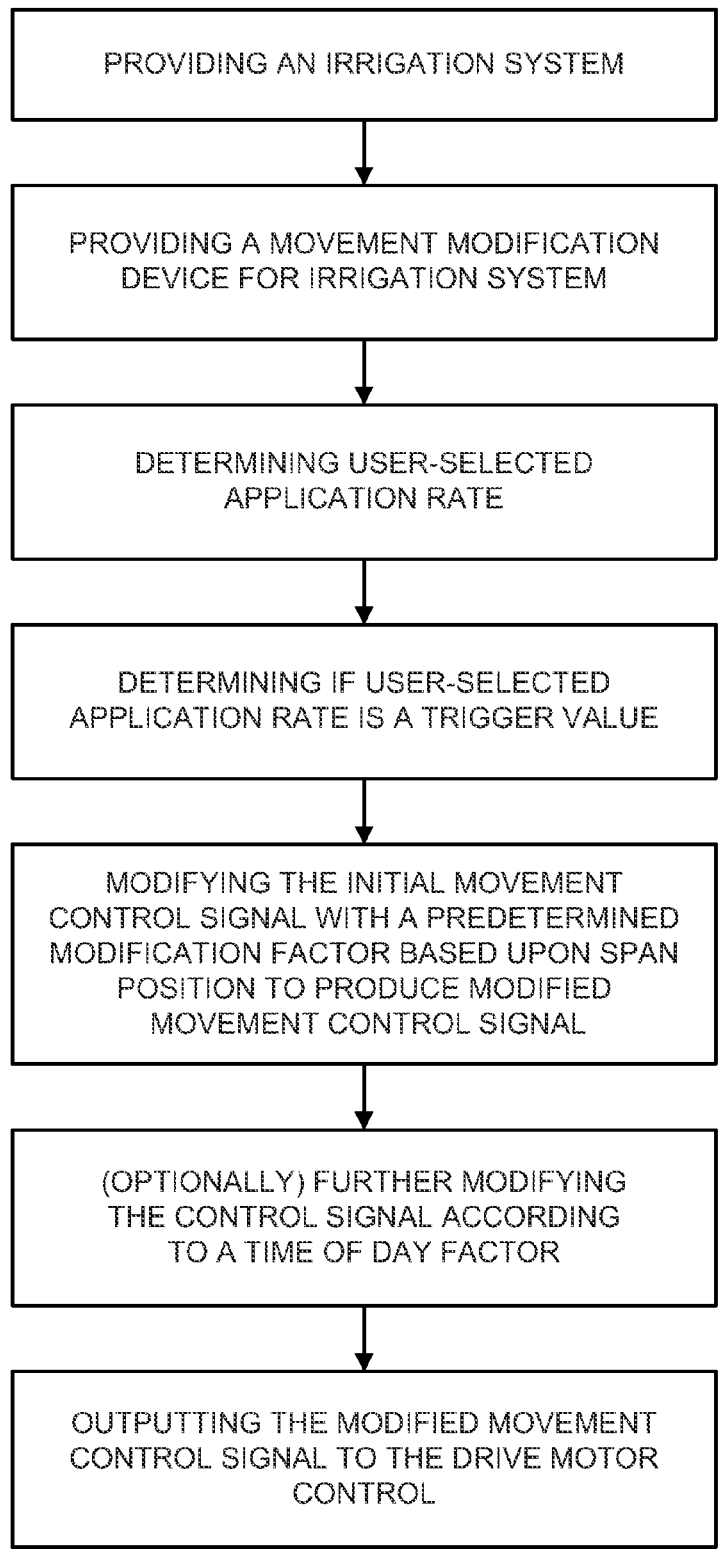
FIG. 4 is a schematic flow diagram of aspects of the method of modifying movement of an irrigation system, according to an illustrative implementation.
Figure 5:
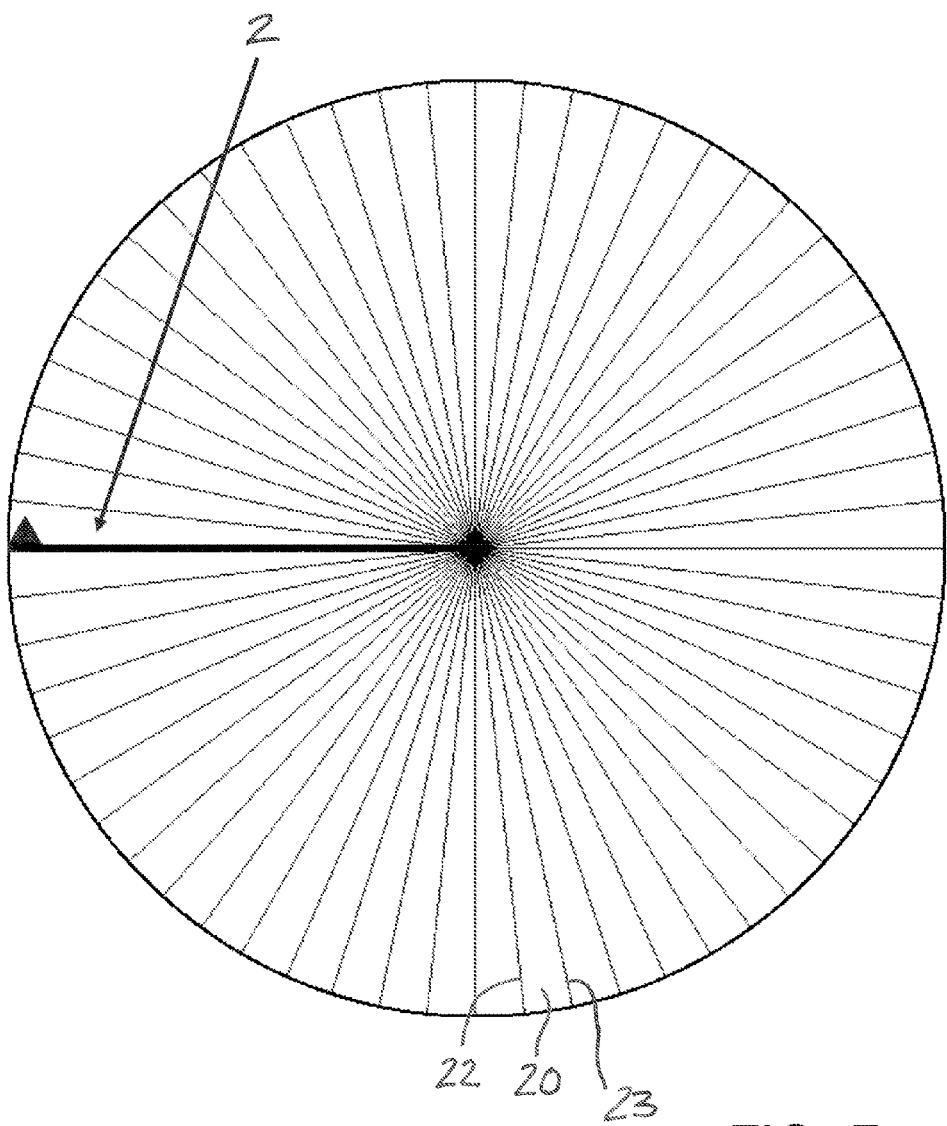
FIG. 5 is a schematic diagram of a field showing illustrative sectors of the field.

With reference now to the drawings, and in particular to FIGS. 1 through 7 thereof, a new system and method for moving spans of an irrigation system embodying the principles and concepts of the disclosed subject matter will be described.

The applicant has recognized that the conventional systems for varying the fluid application rate based upon a table of values that combine a local movement rate prescription with a base movement rate selected by the user can be extremely cumbersome for an operator/farmer to change or adjust to a new base movement rate, since it requires the operator/farmer to upload a different table of values for each and every change in the base movement rate. The farmer/operator may be accustomed to observing the conditions in the field while standing in the field, and then changing the base application rate while in the field (e.g., by setting a dial), and in some instances, the farmer/operator will simply be discouraged from changing the application rate because of the complexity, even if a change in the application rate is otherwise called for or would be more efficient.

In general, the applicant has devised a system in which the operator/farmer is able to control the base movement rate of an irrigation system, via a conventional percentage or percent timer or similar, and the system measures and determines the base movement rate that the operator/farmer has selected, and then converts or adjusts that base movement rate based upon the local movement rate adjustment criteria, which may be represented by a table of multiplier values that reflect the local movement rate adjustments that have been selected for that field based upon localized field conditions such as soil and topography.

The system employs a movement modification unit or device that intercepts the movement control signal, via the percentage or percent timer control wire or similar, sent from the base movement rate control device of the irrigation system to the drive motor control positioned on the outermost tower that instructs the drive motor to turn on and turn off. The endmost tower typically functions as the "leader" in the "follow the leader" manner of movement used by center pivot irrigation systems. In conventional systems, this movement signal reflects the base movement rate selected by the operator/farmer with the base movement control device, e.g., a percent timer, and the signal is automatically turned "on" for the period corresponding to the "on time" for the motor that corresponds to the base movement rate selected by the operator/farmer and turned "off" for the period corresponding to the "off time" for the motor for the base movement rate. The movement modification device of the system receives and samples the incoming control signal from the base movement control device for a period of time that may cover one or more cycles of "on" (movement) and "off" (stoppage) in order to determine the base movement rate setting selected by the operator/farmer without actually having to interface directly with the base movement control device, or be directly accessed and set by the operator/farmer, or having to have a new table of values uploaded for each change in the base movement rate.

Upon determining the base movement rate selected by the operator/farmer, the system then applies a multiplier to that base movement rate to thereby output a modified local movement rate signal for the span based upon span location. The multiplier may be a value stored in a table stored on the movement modification device that represents the increase or decrease in the base movement rate based upon the local movement rate adjustment, which generally reflects the water requirement prescription or characteristics of the field that may vary from location to location in the field, and from one position of the irrigation system spans to another position.

Using the system, the operator/farmer is therefore still able to determine and manually select a base movement rate for the overall application of water to the field, and the movement modification device of the system takes into account this base movement rate when generating the modified local movement rate signal using the local movement rate adjustment.

Optionally, the system may utilize special operation modes when certain settings for the base movement rate are detected by the system. For example, if the system detects that the farmer has selected a base movement rate in the 95 percent to 100 percent movement rate range, then movement modification device of the system may be caused to run the irrigation system (through the drive motor control) at substantially full speed without any "off" time and without applying the multiplier value (e.g., temporarily disables the multiplier). This mode may be highly useful for situations when a chemical (such as a fertilizer or herbicide) is being injected into the irrigation system to be applied to the field, and a uniform base movement rate without regard to the local movement rate is desired. As another example, if the system detects that the operator/farmer has selected a particular base movement rate that is a trigger setting, the movement modification device may apply actual, specific, pre-assigned local movement rate values (not adjustments) from a stored table which may be different from the table of multiplier values. The benefit of this feature is that the operator/farmer may pre-store a unique prescription or table of local percentage or percent rate values to use in response to a particular event, e.g., heavy rain, high winds, etc., without having to upload a new prescription for just a single watering rotation.

Thus, as will be described in greater detail below, the system may measure the on/off cycling of the movement signal sent from the base movement rate control device of the irrigation system to determine the base movement rate selected by the operator/farmer, and may use a multiplier that is based upon the local movement rate adjustment for specific locations in the field to convert the base movement rate to a modified span movement speed that is tailored to the varying conditions of the underlying field. Also, specialized prescriptions or tables or unique situations may be dictated by various particular base movement rate settings selected by the operator/farmer.

In greater detail, the system 10 and method 100 of the disclosure may be utilized on a suitable irrigation system for moving over a ground surface of a field and dispersing water or other fluid over the field surface. An illustrative irrigation system 1 will be described with the understanding that the system 10 of the disclosure may be utilized on irrigation systems that may differ with respect to the illustrative system 1. The irrigation system 1 may include at least two spans 2 with each span having a longitudinal axis and the spans being connected together at junctures such that the longitudinal axes of the spans generally align with each other although flexibility at the junctures may permit some variation in alignment. At least one fluid sprinkler applicator may be mounted on at least one of the spans, but generally each span includes multiple applicators positioned along its length. At least one support tower 3 may be configured to at least partially support the spans 2 at a position above a ground surface, and a support tower may be positioned adjacent to each of the junctures between spans.

The irrigation system 1 may include a control panel 4 with a base application rate setting control or selector 5 that is configured to receive a base application rate setting selected by an operator. The selector may comprise, for example, an application rate-calibrated dial with a user actuated control knob or slide. The control panel 4 may generate an initial or unmodified movement control signal generally corresponding to the selected base application rate to transmit along a control wire or channel 6. The control signal may have an "on" condition that causes the drive assembly of at least one support tower to operate (and the tower to move across the field), and an "off" condition that causes the drive assembly to not operate (and the tower to stop moving across the field). For example, the "on" condition may be represented by a voltage level on the control wire of approximately 120 VAC, and an "off" condition may be represented by a voltage level approaching 0 VAC. Table 1 shows examples of user-selected fluid application rates and the corresponding "on" and "off" time periods for the control signal.

TABLE 1

| User-selected percent fluid application rate | Time period (in seconds) that the transmitted control signal is "on" in a one minute (60 second) time period | Time period (in seconds) that the transmitted control signal is "off" in a one minute (60 second) time period |
| --- | --- | --- |
| 100% | 60 | 0 |
| 75% | 45 | 15 |
| 50% | 30 | 30 |
| 25% | 15 | 45 |

For example, an electrical conductor or wire may form the control wire or a wireless transmission may form the control channel. The control panel may generate the signal using an electromechanical percent timer, computerized/electronic percent timer, a telemetry unit connected to the control wire or channel, or other suitable device. It will be recognized that the control signal may take a number of forms, including the aforementioned "on" and "off" cycling of different periods with substantially uniform voltage levels, continuous signals of different voltage levels in which the voltage level represents the base application rate, and even signals in digital form.

The control panel 4 may also include a movement direction selector 7 that is configured so that the user may select the direction of movement (e.g. forward or reverse) for the spans. For example, the "forward" condition may be represented by a voltage level on the conductor carrying the forward/reverse signal of approximately 120 VAC, and the "reverse" condition may be represented by a voltage level approaching 0 VAC on the conductor. In some embodiments, the forward and reverse condition may simply be detected through the actual movement of the spans, such as by detecting the change in position in the forward direction or the reverse direction, which effectively indicates the condition of the direction selector 7 by indirect means The irrigation system may further comprise a drive assembly that is configured to move the support tower, and the drive assembly may include at least one wheel mounted on the tower that is in contact with the ground surface of the field below the spans. In many applications, a pair of wheels is mounted on each tower. A motor 8 may be connected to the wheel to drive the wheel, and a drive train including a gearbox and drive shafts may be used to communicate the rotation of the motor to the pair of wheels. A drive motor control 9 may be configured to control operation of the motor based upon the control signal received by the motor control from the control panel 4, although in the system 10 the control signal received by the motor control 9 is not received directly from the panel 4.

In one aspect of the disclosure, a system 10 for modifying the movement of the irrigation system 1 will be described. In some embodiments, the system may be entirely or substantially entirely mounted on the irrigation system, and may be mounted on one of the spans of the system 1, and may move with the span. The system 10 may be located on or close to the endmost span of the system, and may be located proximate to the endmost tower. In some of the most preferred implementations, the system may be wholly or substantially wholly incorporated into a housing containing the drive motor control and associated circuitry.

A span position sensing device 12 may be a part of the irrigation system 1, or optionally may be a part of the system 10, and may even be integrated into the movement modification device 14. The position sensing device 12 may determine a current position of the span and provide the position information to the system 10 for use in modification of the base application rate signal by the system as described herein. The technology used to determine the position of the span is not critical to the operation of the system 10, and may include, for example, a Global Positioning Satellite (GPS) signal receiver that detects the span or tower position by GPS coordinates, a GPS receiver that detects span or tower position by degree relative to the center point of the irrigation system 1, a resolver or encoder that detects span or tower position by degree relative to the standpipe at the center point, or a magnetic or gyro compass that detects span or tower position by degree relative to magnetic north and south or true north or south. The position sensing device may generate a current position signal received by the system 10. The character of the current position signal is not critical, and may be in the form of, for example, an angular degree position of the span (with respect to a center of rotation of the span) or location coordinates of the device 12 on the span that corresponds to a position of the span.

The system of the disclosure may include a movement modification device 14 that is configured to receive information regarding one more factors and apply a predetermined modification factor to the control signal received by the device 14. The movement modification device may have a variety of inputs, including but not limited to an input for receiving an initial movement signal from the control panel or other device receiving the user's selected base application rate. The movement modification device may also have inputs for receiving a current span position signal from the position sensing device 12, a movement direction input for receiving a movement direction signal from the movement direction selector 7 or from a sensor sending the current movement direction, and a time of day signal input received from a clock 16 if utilized to modify the control signal. The movement modification device may also include an output for outputting a modified movement control signal to the drive motor control 9. The movement modification device 14 may also include memory or storage capable of storing a table of values for the modification factor. The values may represent a watering prescription for the field, with the value varying from field sector to field sector so that different sectors may receive different water from the irrigation system at different rates. The values may be derived in any suitable manner, but will typically reflect the character and quality of the soil in the particular sector associated with the value and the relative need for water in the sector.

Another aspect of the disclosure relates to a method of moving an irrigation span 2 of an irrigation system 1 across the ground surface of a field. The span or spans of the system typically move through a plurality of sectors 20 of the field. In those irrigation systems in which the spans rotate about a central point in the field, the sectors are substantially pie-shaped and generally triangular. Systems 1 with different types of movement may have different sector shapes, and for example, spans that move across the field in a translation movement may cross several substantially rectangular shaped sectors. Each of the sectors 20 may be bounded by two sector lines 22, 23, and in the case of the pie-shaped sectors, the sector lines will typically radiate from the central pivot point of the irrigation system in different directions.

In some implementations, the method may include providing an irrigation system 1 having at least some of the aspects described herein and also providing a movement modification device also having at least some aspects described herein. The method may further include positioning the movement modification device on one of the spans, such as one of the spans located toward an outward end of the array of spans of the irrigation system. A further step may involve connecting the movement modification device 14 to the control wire 6, and may include connecting a portion of the control wire in communication with the control panel with the input of the movement modification device and connecting a portion of the control wire in communication with the drive motor control 9 to the output of the device 14 in order to output a modified movement control signal to the motor control. In some implementations, the control wire 6 may need to be severed to create the portions connectable to the movement modification device 14.

In another aspect of the method, the initial movement control signal may be received by the movement modification device 14, and the device 14 may determine the user-selected fluid application rate from the control signal received by the device 14 at its input. More specifically, the method may further include detecting the current or present setting of the user control for selecting the base movement rate corresponding to the user-selected fluid application rate. The detection may be effected in various ways, but may include sensing the condition of the signal on the control wire at the input of the movement modification device 14 and counting the time that the signal is in the "on" condition over a one minute period (or multiples thereof). Table 2 shows examples of time periods that the control signal is in the "on" condition and the corresponding determined user-selected application rate.

TABLE 2

| Time period (in seconds) that control signal is detected to be "on" in one minute (60 second) time period | Determination of percent for user-selected fluid application rate |
|---|---|
| 60 | 100% |
| 45 | 75% |
| 30 | 50% |
| 15 | 25% |

The technique for determining the user-selected fluid application rate may vary based upon the form of the control signal, so that if the rate is encoded in the signal by voltage level, then the decoding is performed on a voltage level basis. In some implementations, the movement of the span over a period of time (such as measured by GPS) may provide an indication of the user-selected fluid application rate.

The method may further include determining if the initial movement control signal has a trigger value. A trigger value may be a value of the control signal that has been predetermined to trigger a particular mode of operation by the movement modification device that does not generally follow the regular operation described herein. Illustratively, a first trigger value may correspond to a signal value (and application rate) that is exceedingly low as compared to normal or typical settings, and detection of the signal level may then trigger a first predetermined program of operation by the device. The first predetermined program of movement may comprise, for example, the use of a predetermined table of specific application rates to be applied as an override or exception rather then the use of a multiplier as discussed herein, and thus does not vary with the user-selected application rate. As another example, a second trigger value may correspond to a signal value (and application rate) that is exceedingly high as compared to normal or typical settings, and detection of the signal level may then trigger a second predetermined program of operation by the device. The second predetermined program of movement may comprise, for example, the use of a maximum application rate in all sectors without regard to the user-selected application rate and the application rate prescription previously loaded into storage. It will be apparent to those skilled in the art that other types of operation programs by the movement modification device may be triggered by trigger values.

The method may continue by determining the position of the spans, such as by the movement modification device 14, which may be accomplished by receiving the current position signal by the device 14 from the position sensing device 12. The current position signal may be in any suitable forms, including position coordinates, position angle, field sector, etc.

Another significant step of the method may comprise modifying the initial movement control signal to a modified movement control signal, such as by the movement modification device 14. The modified movement control signal may be modified or altered according to a predetermined modification factor, and the particular value of the modification factor applied to the initial movement control signal may vary according to the position of the span in the field indicated by the current position signal received from the position sensing device. Thus, the value of the modification factor may vary from one span position in a sector of the field to another span position in another sector of the field.

At least one modification factor value may be stored in memory on the movement modification device, or associated storage. A plurality of values of the modification factor may be stored in a position table in the movement modification device or associated storage, and the table may include a plurality of position values and values of the modification factor corresponding to the position values (e.g., sectors). In some implementations, a forward modification factor value and a reverse modification factor value may be stored for each position value so that the value of the modification factor may vary depending upon the movement direction of the span. In some applications, the position information may have to initially be converted from one form to another in order to call up the value from the table. For example, if the values of the modification value are stored according to the sectors of the field, then if the current position signal is received in the form of an angular position value or coordinate position value, then the position value may have to be converted to the corresponding sector value before the corresponding modification factor value can be looked up in the table and applied to the initial movement control signal to derive the modified movement control signal.

As a further optional aspect, the method may include modifying the modified movement control signal according to that time of day that corresponds to the time of modifying the initial movement control signal by the movement modification device. The step may include applying a time of day factor to the modified movement control signal to further modify the control signal to reflect effects of the time of day. Illustratively, the time of day factor may increase the rate of movement of the spans during the dusk and dark hours, when evaporation of the water applied is likely to be relatively less, and may decrease the rate of movement of the spans during daylight hours when evaporation may have more effect. In some implementations, the modified control signal further modified based upon the time of day may be still further modified based upon position, so that the control signal has another modification factor applied such that the time of day factor does not uniformly increase or decrease the modified control signal, but the further modification varies with both time of day and (sector) position in the field.

The method may continue with the sending of the modified movement control signal to the drive motor control 9, or other device directly controlling the operation of the drive motor on the tower usually through the supply of power to the motor. The modified movement control signal may be transmitted through the output of the movement modification device to the control wire or channel to the motor control 9. Operation of the system 1 past the connection of the control wire or channel to the device 14 may be conventional, with the drive motor control simply operating using the modified movement control signal rather than the initial movement control signal.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A method of moving at least two irrigation spans across a ground surface of a field, at least one tower supporting the spans, the at least one tower having a wheel driven by a drive motor controlled by a drive motor control, the method implemented on a movement modification device comprising:
   receiving an initial movement control signal corresponding to a user-selected fluid application rate indicating a rate of movement for the span;
   determining the user-selected fluid application rate from the initial movement control signal;
   determining a position of at least one span in the field;
   modifying the initial movement control signal to a modified movement control signal according to a predetermined modification factor, a value of the modification factor varying according to a position of the span in the field such that the modification factor varies among span positions; and
   sending the modified movement control signal to the drive motor control to thereby modify the rate of movement of the span.

2. The method of claim 1 wherein a plurality of values of the modification factor are stored in a position table in a storage, the table including a plurality of position values and values of the modification factor corresponding to the position values: and
   wherein modifying the initial movement control signal includes retrieving the value of at least one modification factor from storage.

3. The method of claim 1 wherein determining the position of the spans includes receiving a position signal from a position sensing device.

4. The method of claim 3 wherein the field includes a plurality of sectors, the positioning signal indicating one of the sectors in which the span is currently located.

5. The method of claim 1 additionally comprising further modifying the modified movement control signal according to a time of day corresponding to a time of modifying the initial movement control signal.

6. The method of claim 1 wherein the span has a forward movement direction and a reverse movement direction, and further comprising retrieving a value for a forward modification factor for a said position value from storage when the span is moving in the forward movement direction and retrieving a value for a reverse modification factor for a said position value from storage when the span is moving in the reverse movement direction, the value of the modification factor being variable with the movement direction of the span.

7. The method of claim 1 additionally comprising determining if the initial movement control signal has a trigger value, and wherein the modified movement control signal sent to the drive motor control is performed to a predetermining program of values independent of the initial movement control signal.

8. The method of claim 7 additionally comprising determining if the received trigger value corresponds to a first predetermined program or a second predetermined program.

9. The method of claim 1 additionally comprising providing a movement modification device including an input for receiving the initial movement control signal and an output for outputting the modified movement control signal.

10. The method of claim 9 additionally comprising positioning the movement modification device on one of the at least two spans located toward an outward end of the at least two spans.

11. An irrigation system comprising:
    at least two irrigation spans for moving across a ground surface of a field;
    at least one tower supporting the spans;
    a wheel mounted on the at least one tower;
    a drive motor connected to the wheel to rotate the wheel;
    a drive motor control controlling power to the drive motor; and
    a movement modification device mounted on one of the spans, the movement modification device being configured to:
      receive an initial movement control signal corresponding to a user-selected fluid application rate indicating a rate of movement for the span;
      determine the user-selected fluid application rate from the initial movement control signal;
      determine a position of at least one span in the field;
      modify the initial movement control signal to a modified movement control signal according to a predetermined modification factor, a value of the modification factor varying according to a position of the span in the field such that the modification factor varies among span positions, a plurality of values of the modification factor being stored in a position table in a storage of the movement modification device, the table including a plurality of position values and values of the modification factor corresponding to the position values; and
      send the modified movement control signal to the drive motor control to thereby modify the rate of movement of the span.

12. The system of claim 11 wherein the movement modification device is further configured to receive a position signal from a position sensing device.

13. The system of claim 11 wherein the movement modification device is further configured to further modify the modified movement control signal according to a time of day corresponding to a time of modifying the initial movement control signal.

14. The method system of claim 11 wherein the span has a forward movement direction and a reverse movement direction, and
    wherein the movement modification device is further configured to retrieve a value for a forward modification factor for a said position value from storage when the span is moving in the forward movement direction and retrieve a value for a reverse modification factor for a said position value from storage when the span is moving in the reverse movement direction, the value of the modification factor being variable with the movement direction of the span.

15. The system of claim 11 wherein the movement modification device is further configured to determine if the initial movement control signal has a trigger value, and wherein the modified movement control signal sent to the drive motor control is performed to a predetermining program of values independent of the initial movement control signal.

\* \* \* \* \*